(12) United States Patent
Jwa et al.

(10) Patent No.: US 10,552,494 B2
(45) Date of Patent: Feb. 4, 2020

(54) CONTENT PROVIDING METHOD OF CONTENT PROVIDING SYSTEM AND ELECTRONIC APPARATUS

(71) Applicant: Samsung Electronics Co., Ltd., Gyeonggi-do (KR)

(72) Inventors: Chang Hyup Jwa, Jeju-do (KR); Kyung Tae Kim, Gyeonggi-do (KR); Jung Jik Lee, Daejeon (KR); Sung Min Yoon, Gyeonggi-do (KR); Sun Kee Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 181 days.

(21) Appl. No.: 15/058,694

(22) Filed: Mar. 2, 2016

(65) Prior Publication Data

US 2016/0259855 A1 Sep. 8, 2016

(30) Foreign Application Priority Data

Mar. 2, 2015 (KR) ........................ 10-2015-0028963

(51) Int. Cl.
*H04L 9/00* (2006.01)
*G06F 16/951* (2019.01)
*H04L 29/06* (2006.01)
*H04W 4/80* (2018.01)

(52) U.S. Cl.
CPC ........ *G06F 16/951* (2019.01); *H04L 63/0428* (2013.01); *H04W 4/80* (2018.02)

(58) Field of Classification Search
CPC ................................................ G06F 17/30864
USPC ........................................................ 713/168
See application file for complete search history.

(56) References Cited

U.S. PATENT DOCUMENTS

| 8,214,890 B2 | 7/2012 | Kirovski et al. |
| 8,392,527 B2 | 3/2013 | Haines et al. |
| 8,615,505 B2 | 12/2013 | Ramer et al. |
| 8,788,617 B2 | 7/2014 | Cardozo |

(Continued)

FOREIGN PATENT DOCUMENTS

| KR | 1020100122978 | 11/2010 |
| WO | WO 2007/078847 | 7/2007 |

OTHER PUBLICATIONS

European Search Report dated Jun. 24, 2016 issued in counterpart application No. 16158252.3-1853, 11 pages.

*Primary Examiner* — Alexander Lagor
*Assistant Examiner* — Syed M Ahsan
(74) *Attorney, Agent, or Firm* — The Farrell Law Firm, P.C.

(57) ABSTRACT

A content providing method of a content providing system is provided. The method includes transmitting identification information in a broadcasting manner from a first electronic device, if the identification information is received, generating user history information based on a receiving record of the identification information, at a second electronic device, transmitting the user history information to a database server from the second electronic device, transmitting the user history information to the first electronic device from the database server, transmitting the user history information to a content server at the first electronic device, transmitting a content associated with the user history information to the first electronic device from the content server, and providing the content to a user of the first electronic device.

6 Claims, 7 Drawing Sheets

(56) References Cited

U.S. PATENT DOCUMENTS

| | | |
|---|---|---|
| 2002/0184338 A1 | 12/2002 | Haines et al. |
| 2007/0061331 A1 | 3/2007 | Ramer et al. |
| 2008/0052380 A1* | 2/2008 | Morita .................... G06F 16/48 |
| | | 709/219 |
| 2008/0270229 A1 | 10/2008 | Manne et al. |
| 2008/0271119 A1 | 10/2008 | Manna et al. |
| 2010/0058064 A1 | 3/2010 | Kirovski et al. |
| 2013/0059531 A1 | 3/2013 | Kim et al. |
| 2013/0085851 A1 | 4/2013 | Pedro et al. |
| 2013/0097015 A1 | 4/2013 | Ramer et al. |
| 2013/0114386 A1* | 5/2013 | Sato ................ G11B 20/00086 |
| | | 369/47.12 |
| 2013/0246563 A1 | 9/2013 | Cardozo |
| 2013/0254172 A1* | 9/2013 | Watanabe ............. H04W 4/029 |
| | | 707/694 |
| 2013/0282438 A1* | 10/2013 | Hunter ...................... G01S 1/02 |
| | | 705/7.32 |
| 2013/0346215 A1 | 12/2013 | Tajima et al. |
| 2014/0373123 A1 | 12/2014 | Kang |
| 2015/0026181 A1 | 1/2015 | Milton et al. |
| 2016/0007136 A1* | 1/2016 | Chen ..................... H04W 4/008 |
| | | 370/311 |
| 2016/0070894 A1* | 3/2016 | Boodaei ................ H04L 63/045 |
| | | 713/155 |

* cited by examiner

CONTENT PROVIDING METHOD OF CONTENT PROVIDING SYSTEM AND ELECTRONIC APPARATUS

PRIORITY

This application claims priority under 35 U.S.C. § 119(a) to Korean Patent Application Serial No. 10-2015-0028963, which was filed on Mar. 2, 2015, in the Korean Intellectual Property Office, the entire content of which is incorporated herein by reference.

BACKGROUND

1. Field of the Disclosure

The present disclosure generally relates to a content providing system providing advertising content through a web browser and a content providing method of an electronic device.

2. Description of the Related Art

Advertising content is typically provided through television, radio, and the like. However, with the advancement of electronic technologies, various electronic devices are developed and are widely distributed. For this reason, users are provided with advertising content by various methods. For example, advertising content appears in the form of a banner ad while a user surfs the web using a web browser.

In this case, information may be provided to the user. However, it is possible to provide a user-customized advertising content based on web surfing history of the user.

Since the web surfing history of the user is stored in an electronic device on which the user surfs the web, the web surfing history may be available only where the user connects to a web page through a corresponding electronic device. In the case where the same user uses a different electronic device, it may be difficult to utilize the web surfing history.

SUMMARY

Aspects of the present disclosure address at least the above-mentioned problems and/or disadvantages and to provide at least the advantages described below. Accordingly, an aspect of the present disclosure is to provide user-customized advertisement content using web surfing history of a user when a different electronic device of the user or a public electronic device is used. Another aspect of the present disclosure is to provide user-customized advertising content using web surfing history of user and an off-line activity history thereof when a different electronic device of the user or a public electronic device is used.

In accordance with an aspect of the present disclosure, a content providing method of a content providing system is provided. The method includes transmitting identification information in a broadcasting manner from a first electronic device, if the identification information is received, generating user history information based on a receiving record of the identification information, at a second electronic device, transmitting the user history information to a database server from the second electronic device, transmitting the user history information to the first electronic device from the database server, transmitting the user history information to a content server from the first electronic device, transmitting content associated with the user history information to the first electronic device from the content server, and providing the content to a user of the first electronic device.

In accordance with another aspect of the present disclosure, a content providing method of a first electronic device is provided. The method includes transmitting identification information in a broadcasting manner, transmitting user history information generated according to a receiving record of the identification information, to a content server if the user history information is received from a database server, and providing content associated with the user history information if the content is received from the content server to a user.

In accordance with another aspect of the present disclosure, a content providing method of a second electronic device is provided. The method includes generating user history information based on a receiving record of identification information if the identification information is received from a first electronic device, and transmitting the user history information to a database server.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
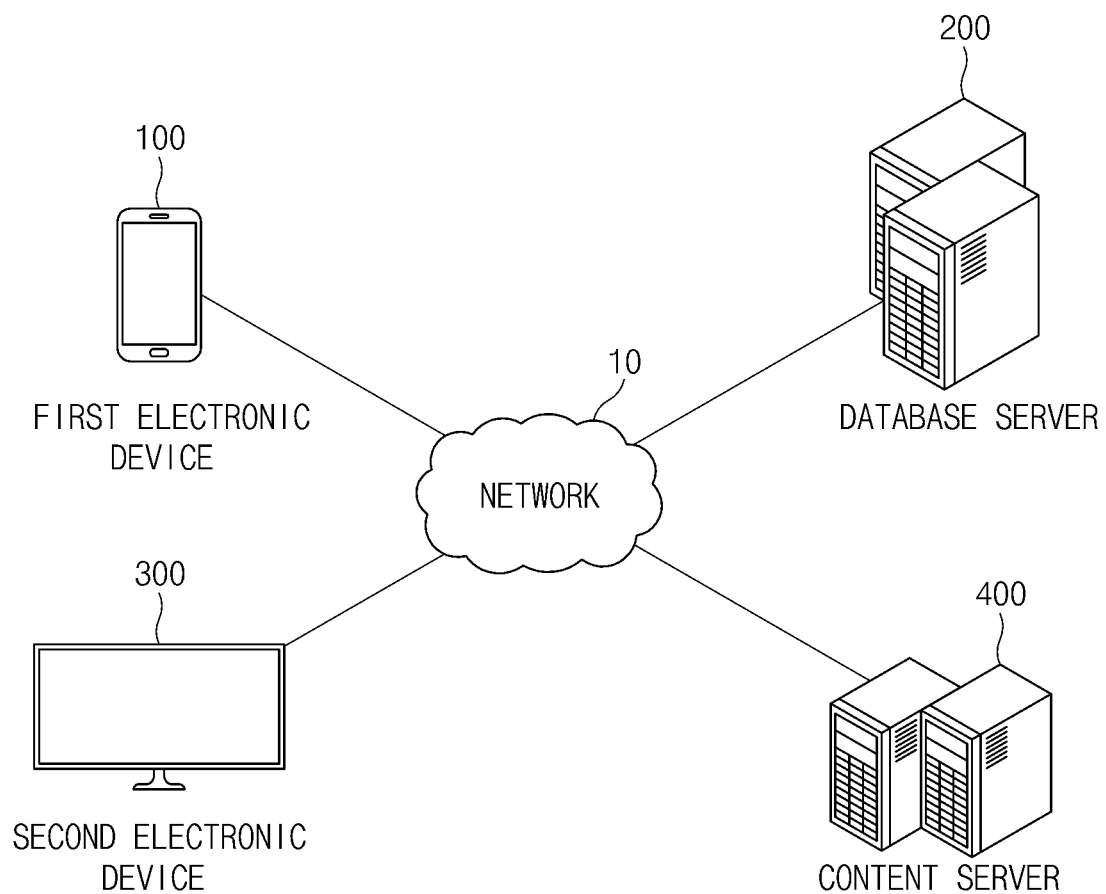
FIG. 1 is a diagram illustrating a content providing system according to various embodiments of the present disclosure.

Various embodiments of the present disclosure may be described with reference to the accompanying drawings. Accordingly, those of ordinary skill in the art will recognize that modified, equivalent, and/or alternative embodiments described herein can be made without departing from the scope and spirit of the present disclosure.

In the present disclosure, the expressions "have", "may have", "include" and "comprise", or "may include" and "may comprise" used herein indicate existence of corresponding features (e.g., elements such as numeric values, functions, operations, or components) but do not exclude the presence of additional features.

In the present disclosure, the expressions "A or B", "at least one of A or/and B", or "one or more of A or/and B", and the like used herein may include any and all combinations of one or more of the associated listed items. For example, the term "A or B", "at least one of A and B", or "at least one of A or B" may refer to all of the following cases (1) where at least one A is included, case (2) where at least one B is included, or case (3) where both of at least one A and at least one B are included.

The terms, such as "first", "second", and the like used herein may refer to various elements of various embodiments of the present disclosure, but do not limit the elements. For example, such terms do not limit the order and/or priority of the elements. Furthermore, such terms may be used to distinguish one element from another element. For example, "a first user device" and "a second user device" indicate different user devices. For example, without departing the scope of the present disclosure, a first element may be referred to as a second element, and similarly, a second element may be referred to as a first element.

It will be understood that when an element (e.g., a first element) is referred to as being "(operatively or communicatively) coupled with/to" or "connected to" another element (e.g., a second element), the element can be directly coupled with/to or connected to the other element or an intervening element (e.g., a third element) may be present. In contrast, when an element (e.g., a first element) is referred to as being "directly coupled with/to" or "directly connected to" another element (e.g., a second element), it should be understood that there are no intervening elements (e.g., a third element).

According to the context, the expression "configured to" as used herein may be used interchangeably with, for example, the expressions "suitable for", "having the capacity to", "designed to", "adapted to", "made to", or "capable of". The term "configured to" does not mean only "specifically designed to" in hardware. Instead, the expression "a device configured to" may mean that the device is "capable of" operating together with another device or other components. For example, a "processor configured to perform A, B, and C" may mean a dedicated processor (e.g., an embedded processor) for performing a corresponding operation or a general-purpose processor (e.g., a central processing unit (CPU) or an application processor) which may perform corresponding operations by executing one or more software programs which are stored in a memory device.

Terms used in the present disclosure are used to describe specified embodiments of the present disclosure and do not limit the scope of the present disclosure. The terms of a singular form may include plural forms unless otherwise specified. Unless otherwise defined herein, all terms used herein, which include technical or scientific terms, may have the same meaning that is generally understood by a person of ordinary skill in the art. It will be further understood that terms, which are defined in a dictionary and commonly used, should also be interpreted as is customary in the relevant related art and not in an idealized or overly formal definition unless expressly so defined herein in various embodiments of the present disclosure. In some cases, even if terms are defined in the specification, they are not to be interpreted to exclude embodiments of the present disclosure.

An electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group (MPEG-1 or MPEG-2) Audio Layer 3 (MP3) players, mobile medical devices, cameras, wearable devices (e.g., head-mounted-devices (HMDs), such as electronic glasses), an electronic apparel, electronic bracelets, electronic necklaces, electronic appcessories, electronic tattoos, smart mirrors, smart bands, smart watches, and the like.

According to various embodiments of the present disclosure, the electronic devices may be smart home appliances. The smart home appliances may include at least one of, for example, televisions (TVs), digital versatile disc (DVD) players, audio players, refrigerators, air conditioners, cleaners, ovens, microwave ovens, washing machines, air cleaners, set-top boxes, TV boxes (e.g., Samsung HomeSync™, Apple TV™, or Google TV™), game consoles (e.g., Xbox™ and PlayStation™), electronic dictionaries, electronic keys, camcorders, electronic picture frames, and the like.

According to various embodiments of the present disclosure, the electronic devices may include at least one of medical devices (e.g., various portable medical measurement devices (e.g., a blood glucose monitoring device, a heartbeat measuring device, a blood pressure measuring device, a body temperature measuring device, and the like)), a magnetic resonance angiography (MRA), a magnetic resonance imaging (MRI), a computed tomography (CT), scanners, and ultrasonic devices) receiving a user input in an idle mode, navigation devices, global positioning system (GPS) receivers, event data recorders (EDRs); flight data recorders (FDRs), vehicle infotainment devices, electronic equipment for vessels (e.g., navigation systems and gyrocompasses), avionics, security devices, head units for vehicles, industrial or home robots, automatic teller machines (ATMs), point of sale (POSs) terminals, or Internet of Things (IoT) devices (e.g., light bulbs, various sensors, electric or gas meters, sprinkler devices, fire alarms, thermostats, street lamps, toasters, exercise equipment, hot water tanks, heaters, boilers, and the like).

According to an embodiment of the present disclosure, the electronic devices may include at least one of furniture or buildings/structures, electronic boards, electronic signature receiving devices, projectors, or various measuring instruments (e.g., water meters, electricity meters, gas meters, or wave meters, and the like). The electronic devices according to an embodiment of the present disclosure may be one or more combinations of the above-mentioned devices. According to an embodiment of the present disclosure, an electronic device may be a flexible electronic. Electronic devices according to various embodiments of the present disclosure are not limited to the above-mentioned devices, and may include new electronic devices according to the development of new technologies.

Hereinafter, electronic devices according to an embodiment of the present disclosure will be described with reference to the accompanying drawings. The term "user" used herein may refer to a person who uses an electronic device or may refer to a device (e.g., an artificial intelligence electronic device) that uses an electronic device.

FIG. 1 is a diagram illustrating a content providing system according to various embodiments of the present disclosure.

Referring to FIG. 1, a content providing system 1000 includes a first electronic device 100, a database server 200, a second electronic device 300, and a content server 400. The first electronic device 100, the database server 200, the second electronic device 300, and the content server 400 may be connected to each other through a network 10 so as to communicate with each other. For example, the first electronic device 100, the database server 200, the second electronic device 300, and the content server 400 may be connected to each other through an Internet network or a mobile network.

According to an embodiment of the present disclosure, the content providing system 1000 may provide a user with content which is based on user activities, through a web browser installed on the first electronic device 100 or the second electronic device 300. A website operator may assign at least a part of a web page to content providers, and the content providers may provide content, such as adverting information and the like, to the assigned area. If an electronic device connects to a web page through a web browser, the electronic device may receive content together with contents of the web page and may provide the received content to the user. The user may use a content providing service by an existing web browser without installation of a separate application program regardless of being on-line or off-line.

For example, the content providing system 1000 may provide content to the user through the first electronic device 100 based on user activity information in a shopping mall or may provide content to the user through the second electronic device 300 located at the shopping mall. As another example, the content providing system 1000 may provide content to the user through the second electronic device 300 located at the off-line mall, based on web activity information of the user which uses the first electronic device 100.

The first electronic device 100 may be a personal electronic device which a user provided with content owns. For example, the first electronic device 100 may be a personal electronic device such as a smartphone, a tablet PC, a notebook PC, a desktop PC, a smart TV, a wearable device, and the like.

The electronic device 100 may transmit identification information. According to an embodiment of the present disclosure, the first electronic device 100 may transmit identification information within a specific range in a broadcasting manner. For example, in the case where the user carries and moves the first electronic device 100, a range in which the first electronic device 100 transmits the identification information may also move according to a movement of the user; the first electronic device 100 may transmit the identification information to the second electronic device 300 located within a range where the identification information is transmitted. The first electronic device 100 may transmit the identification information using a communication technology such as Bluetooth (e.g., Bluetooth low energy (BLE)), wireless-fidelity (Wi-Fi), a near field communication (NFC), Zigbee, and the like. In the case where the first electronic device 100 transmits the identification information using BLE, the identification information may be transmitted through BLE advertising channels and may be included in a payload portion of a BLE advertising packet. The identification information may be device identification information (e.g., a mobile station international ISDN number (MSISDN), an international mobile equipment identity (IMEI), an electronic serial number (ESN), a media access control (MAC) address, or account information (e.g., identifier (ID) and password) of an application (e.g., a web browser). The first electronic device 100 may transmit encrypted identification information.

The first electronic device 100 may generate and store user history information based on an on-line activity of the user. The on-line activity of the user may include, for example, all user activities which are made on a network using an application. The user history information which are generated based on the on-line activity of the user may generate and store, for example, a user ID of a specific application or a website (e.g., a website operated by a content server), a password, a search record, a content (e.g., a specific product or article information) of information requested by a user, credit card information, an Internet protocol (IP) address, and the like. According to an embodiment of the present disclosure, the user history information may refer to cookie information which a web browser provides.

The first electronic device 100 may generate and store the user history information based on a software operation or use pattern in the first electronic device 100 of the user. The first electronic device 100 may generate and store the user history information based on an operation or pattern which is used for the user to operate a social network service (SNS), a game, a video, a photo, a camera, application software, and the like.

The first electronic device 100 and the database server 200 may share the user history information. For example, if new user history information is generated at the first electronic device 100, the first electronic device 100 may transmit the new user history information to the database server 200. If receiving new user history information from the second electronic device 300, the database server 200 may transmit the new user history information to the first electronic device 100.

The database server 200 may store the user history information in the form of a database. According to an embodiment of the present disclosure, the database server 200 may receive and store user history information from the first electronic device 100 or the second electronic device 300. The database server 200 may store identification information of an electronic device, collected during the procedure for registration at a content providing service, and user history information for each content provider.

If the first electronic device 100 or the second electronic device 300 requests user history information and identification information from the database server 200, the database server 200 may transmit the user history information corresponding to the identification information to the first electronic device 100 or the second electronic device 300.

The second electronic device 300 may receive identification information from the first electronic device 100. According to an embodiment of the present disclosure, the content providing system 1000 may include a plurality of second electronic devices 300, and each of the second electronic devices 300 may exist at a fixed location of a specific space. For a department store, for example, the second electronic device 300 may be located at each entrance, each passageway, each shop, or each shelf. The second electronic device 300 may share received identification information.

The second electronic device 300 may generate user history information based on an off-line activity of the user. For example, if receiving identification information from the first electronic device 100, the second electronic device 300 may generate user history information based on a receiving record (e.g., a receiving time) about the identification information. The user history information which is generated based on the receiving record (e.g., the receiving time) about the identification information may include, for example, a preferred brand, an interested product category, an interested product code, and the like. According to an embodiment of the present disclosure, the user history information may refer to cookie information, product payment information, and the like, which a web browser provides. The second electronic device 300 may store attribute information. The attribute information of the second electronic device 300 may include, for example, a service or product category (e.g., food, men's clothes, and the like), a shop name, a product type (e.g., top, bottoms, coat, and the like), based on a location where the second electronic device 300 is located. The second electronic device 300 may generate user history information based on a receiving record of the identification information and attribute information. For example, if the second electronic device 300 located at a coat shelf of men's clothes shop receives identification information for more than a specific period of time, the second electronic device 300 may generate user history information associated with a coat of the men's clothes. If the user history information is generated, the second electronic device 300 may transmit the user history information to the database server 200.

If receiving the user history information, the second electronic device 300 may request the user history information from the database server 200. According to an embodiment of the present disclosure, the second electronic device 300 may transmit identification information together in requesting the user history information. If receiving the user history information from the database server 200, the second electronic device 300 may transmit the user history information to the content server 400. The second electronic device 300 may receive content associated with the user history information from the content server 400 and may provide the received content to the user.

According to an embodiment of the present disclosure, the second electronic device 300 may be implemented with a wireless receiving device which receives identification information that the first electronic device 100 transmits in a broadcasting manner or a computer, a monitor, a mobile device, a television, or a point of sale (POS) terminal capable of providing content.

The content server 400 may store content information to be provided to the first electronic device 100 or the second electronic device 300. According to an embodiment of the present disclosure, the content information may include advertising information. For example, the content information may include information about products, such as an industrial product, a movie, a concert, an airline ticket, a book, a record, facilities (e.g., an amusement park), sale event information, sale coupon information, and the like.

If receiving user history information from the first electronic device 100 or the second electronic device 300, the content server 400 may transmit content corresponding to the user history information to the first electronic device 100 or the second electronic device 300. For example, if the user history information includes a specific product code which the user searches for, the content server 400 may provide information about a corresponding product to the first electronic device 100 or the second electronic device 300.

Figure 2:
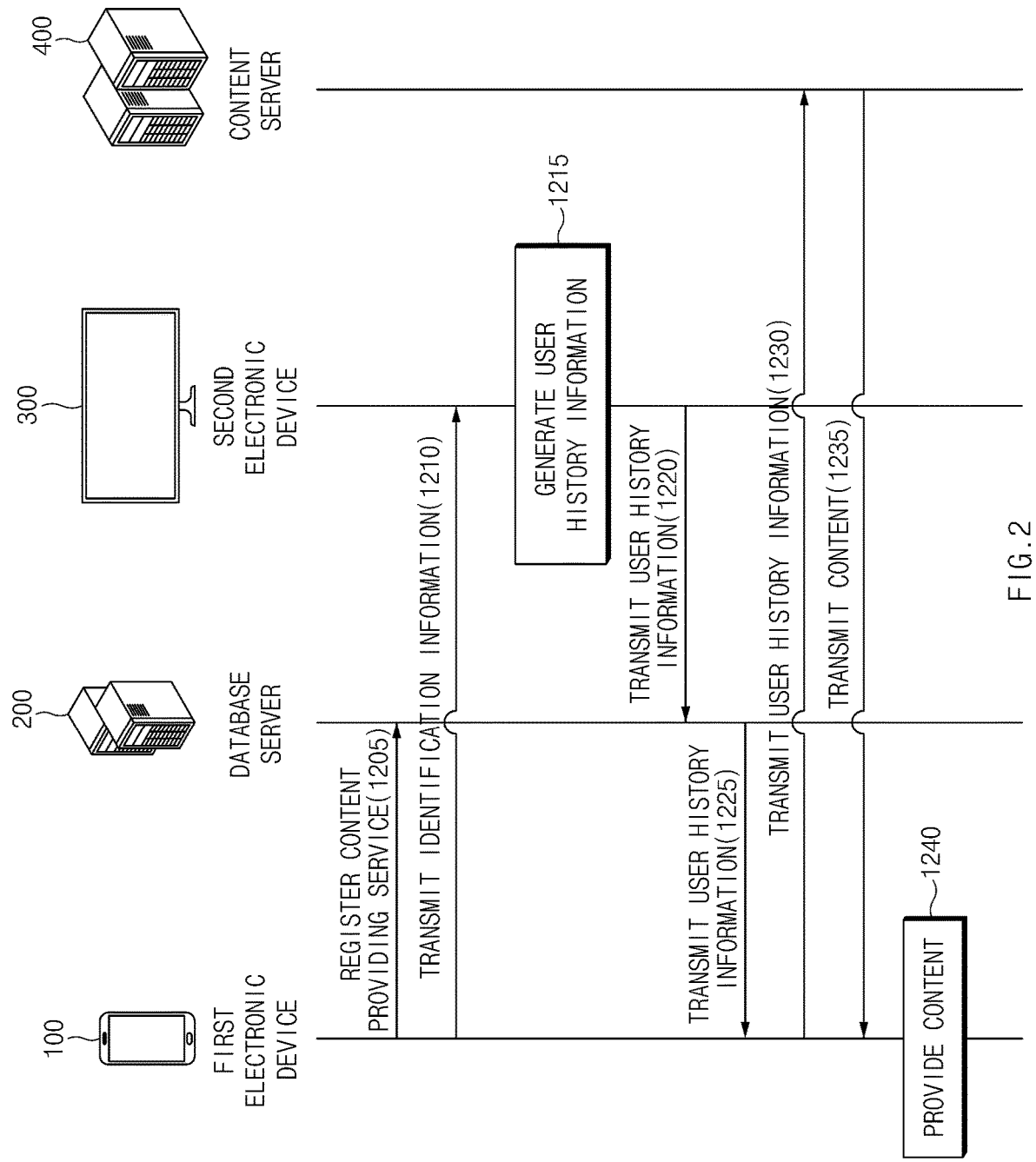
FIG. 2 is a flow diagram illustrating a content providing method according to various embodiments of the present disclosure.

FIG. 2 is a flow diagram illustrating a content providing method according to various embodiments of the present disclosure. The flow diagram illustrated in FIG. 2 describes an embodiment in which content is provided through the first electronic device 100 using user history information which is based on off-line activity of a user. The flow diagram illustrated in FIG. 2 may include operations which the content providing system 1000 illustrated in FIG. 1 processes. The above description of the content providing system 1000 given with reference to FIG. 1 may be applied to the flow diagram illustrated in FIG. 2.

Referring to FIG. 2, in step 1205, the electronic device 100 registers with a content providing service. The procedure for registration with the content providing service will be described with reference to FIG. 5.

In step 1210, the first electronic device 100 transmits identification information. According to an embodiment of the present disclosure, the first electronic device 100 may transmit identification information within a specific range in a broadcasting manner. The first electronic device 100 may transmit the identification information using a local area network technology such as Bluetooth, Wi-Fi, NFC, Zigbee, and the like. The first electronic device 100 may transmit encrypted identification information.

If receiving identification information from the first electronic device 100, in step 1215, the second electronic device 300 generates user history information based on a receiving record (e.g., a receiving time) about the identification information. According to an embodiment of the present disclosure, the second electronic device 300 may generate the user history information based on a receiving record of the identification information and attribute information. In step 1220, the second electronic device 300 transmits the user history information to the database server 200.

In step 1225, the database server 200 transmits the user history information to the first electronic device 100. According to an embodiment of the present disclosure, the database server 200 may transmit the user history information periodically or in response to a request from the first electronic device 100. For example, if a web browser is executed, the first electronic device 100 may transmit the user history information to the database server 200.

In step 1230, the first electronic device 100 transmits the user history information to the content server 400. According to an embodiment of the present disclosure, if the first electronic device 100 connects to a specific web page including an area assigned to a content provider, the first electronic device 100 may transmit the user history information to the content server 400.

If receiving the user history information from the first electronic device 100, in step 1235, the content server 400 transmits content associated with the user history information to the first electronic device 100.

In step 1240, the first electronic device 100 provides the received content to the user.

Figure 3:
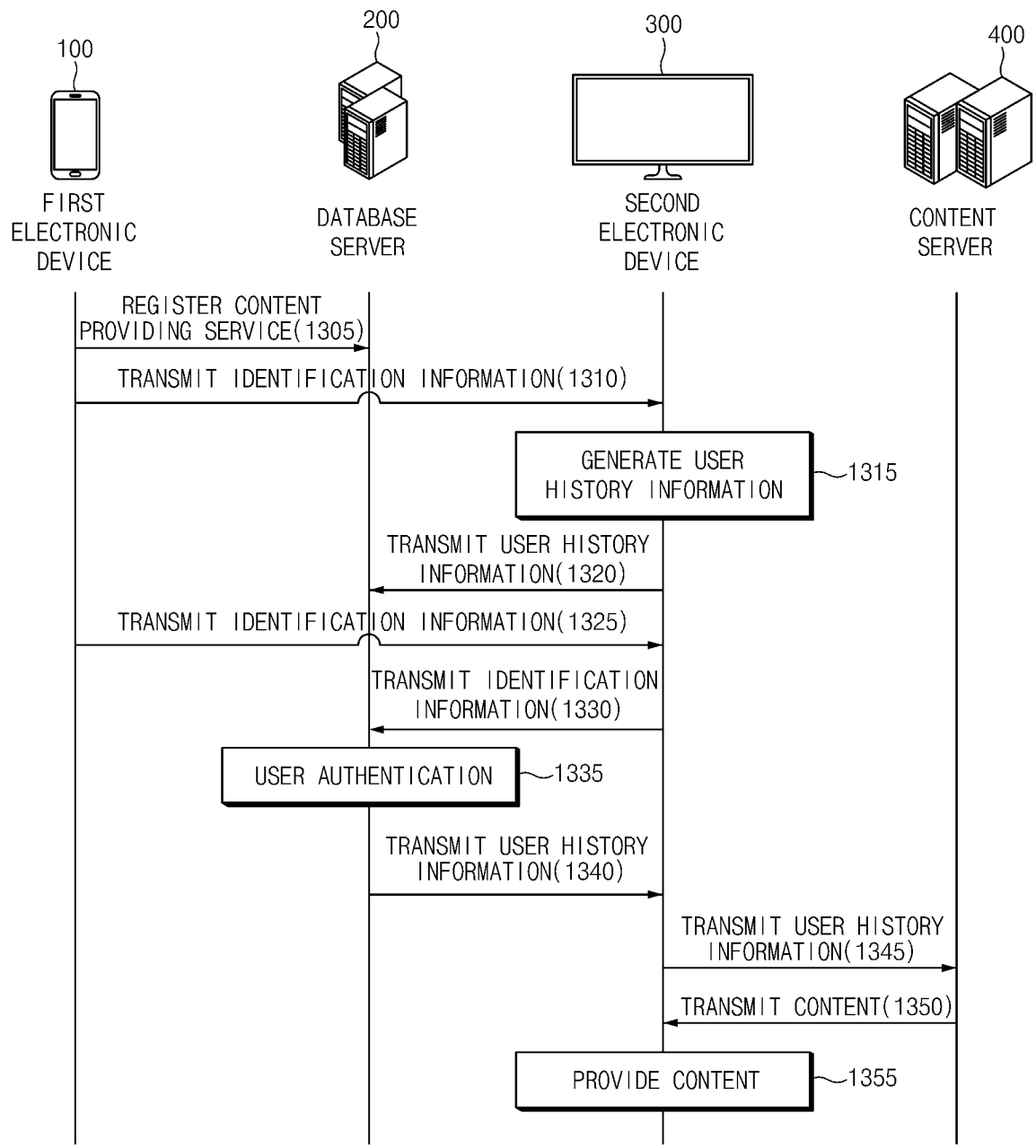
FIG. 3 is a flow diagram illustrating a content providing method according to various embodiments of the present disclosure.

FIG. 3 is a flow diagram illustrating a content providing method according to various embodiments of the present disclosure. A flow diagram illustrated in FIG. 3 describes an embodiment in which content is provided through the second electronic device 300 using user history information which is based on an off-line activity of a user. A flow diagram illustrated in FIG. 3 may include operations which the content providing system 1000 illustrated in FIG. 1 processes. The above description about the content providing system 1000 given with reference to FIG. 1 may be applied to the flow diagram illustrated in FIG. 3.

Referring to FIG. 3, in step 1305, the electronic device 100 registers with a content providing service. The procedure for registration with the content providing service will be described with reference to FIG. 5.

In step 1310, the first electronic device 100 transmits identification information. According to an embodiment of the present disclosure, the first electronic device 100 may transmit identification information within a specific range in a broadcasting manner. The first electronic device 100 may transmit the identification information using a local area network technology such as Bluetooth, Wi-Fi, NFC, Zigbee, or the like. The first electronic device 100 may transmit encrypted identification information.

If receiving identification information from the first electronic device 100, in step 1315, the second electronic device 300 generates user history information based on a receiving record (e.g., a receiving time) about the identification information. According to an embodiment of the present disclosure, the second electronic device 300 may generate the user history information based on a receiving record of the identification information and attribute information. In step 1320, the second electronic device 300 transmits the user history information to the database server 200.

In step 1325, the first electronic device 100 transmits identification information. According to an embodiment of the present disclosure, the first electronic device 100 may transmit identification information within a specific range in a broadcasting manner.

If receiving the user history information from the first electronic device 100, in step 1330, the second electronic device 300 transmits identification information to the database server 200. According to an embodiment of the present disclosure, the second electronic device 300 may request the user history information corresponding to the identification information from the database server 200 while transmitting the identification information to the database server 200. In the case where the identification information received from the first electronic device 100 is encrypted, the second electronic device 300 may not know information (e.g., device identification information, user ID, and the like) about the first electronic device 100, thereby protecting the first electronic device 100 or personal information of the user of the first electronic device 100.

If receiving identification information from the second electronic device 300, in step 1335, the database server 200 performs user authentication using the identification information. For example, in the case where the identification information includes an ID and a password, the database server 200 may perform user authentication by comparing the ID and password included in the identification information with an ID and a password received during the procedure for registration with a content providing service. In the case where the identification information is encrypted, the database server 200 may decrypt the encrypted identification information and may then perform user authentication. In the case where the identification information does not include a password (e.g., in the case where the identification information is device identification information), the user authentication procedure may be skipped.

In step 1340, the database server 200 transmits the user history information to the second electronic device 300. According to an embodiment of the present disclosure, the database server 200 transmits user history information corresponding to the identification information received from the second electronic device 300.

If receiving the user history information from the database server 200, in step 1340, the second electronic device 300 transmits the user history information to the content server 400.

If receiving the user history information from the second electronic device 300, in step 1350, the content server 400 transmits content associated with the user history information to the second electronic device 300.

In step 1355, the second electronic device 300 provides the received content to the user.

Figure 4:
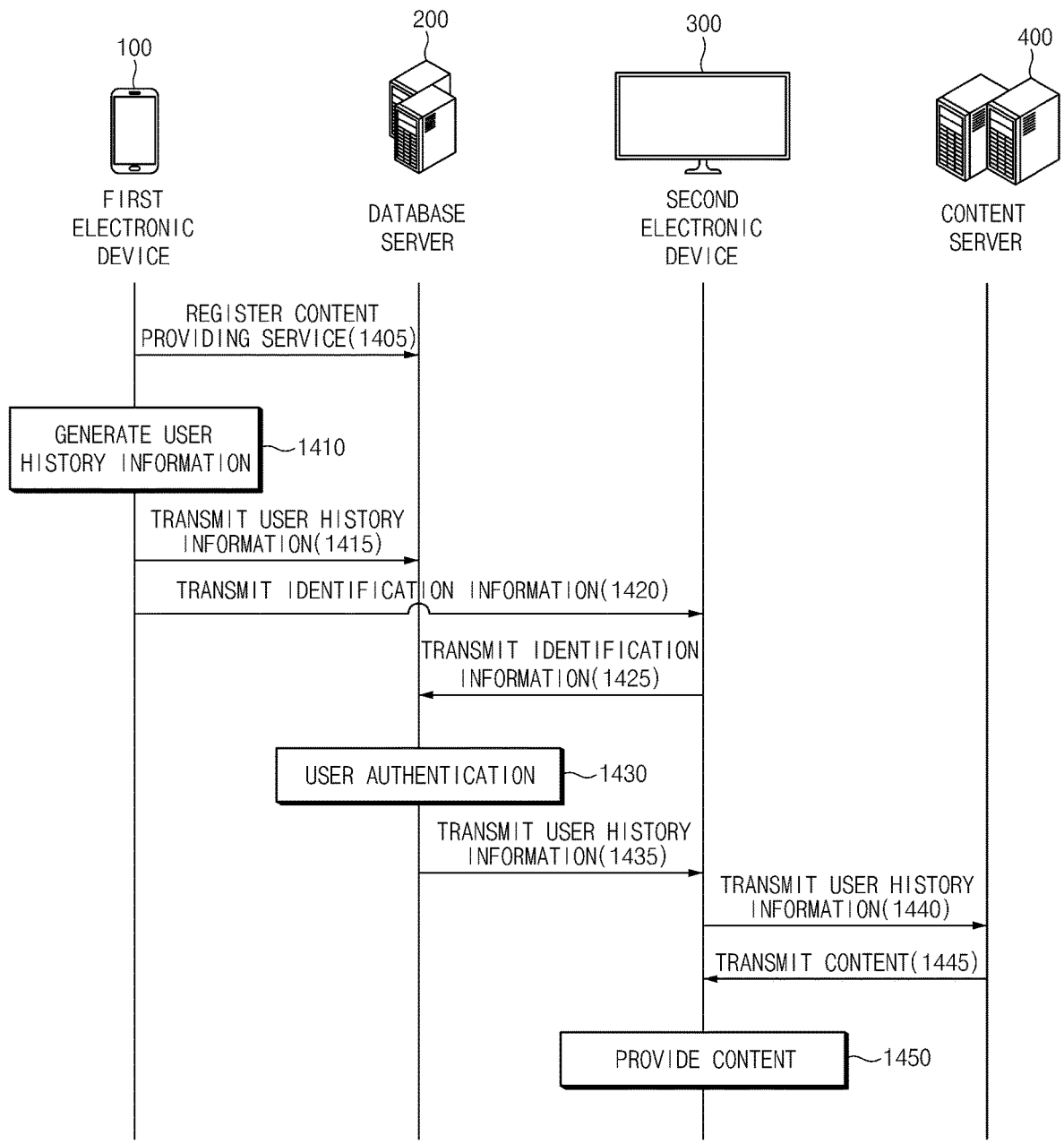
FIG. 4 is a flow diagram illustrating a content providing method according to various embodiments of the present disclosure.

FIG. 4 is a flow diagram illustrating a content providing method according to various embodiments of the present disclosure. A flow diagram illustrated in FIG. 4 describes an embodiment in which content is provided through the second electronic device 300 using user history information which is based on an on-line activity of a user. A flow diagram illustrated in FIG. 4 may include operations which the content providing system 1000 illustrated in FIG. 1 processes. The above description about the content providing system 1000 given with reference to FIG. 1 may be applied to the flow chart illustrated in FIG. 4.

Referring to FIG. 4, in step 1405, the electronic device 100 registers with a content providing service. The procedure for registration with the content providing service will be described with reference to FIG. 5.

In step 1410, the first electronic device 100 generates user history information based on an on-line activity of the user. The first electronic device 100 may generate and store, for example, a user ID of a specific application or a website (e.g., a website operated by a content provider), a password, a search record, a content (e.g., a specific product or article information) of information requested by a user, product payment information, credit card information, an Internet protocol (IP) address, and the like. According to an embodiment of the present disclosure, the user history information may refer to cookie information which a web browser provides. In step 1415, the second electronic device 300 transmits the user history information to the database server 200.

In step 1420, the first electronic device 100 transmits identification information. According to an embodiment of the present disclosure, the first electronic device 100 may transmit identification information within a specific range in a broadcasting manner. The first electronic device 100 may transmit the identification information using a local area network technology such as Bluetooth, Wi-Fi, NFC, Zigbee, and the like. The first electronic device 100 may transmit encrypted identification information.

If receiving the user history information from the first electronic device 100, in step 1425, the second electronic device 300 transmits identification information to the database server 200. According to an embodiment of the present disclosure, the second electronic device 300 may request the user history information corresponding to the identification information from the database server 200 while transmitting the identification information to the database server 200. In the case where the identification information received from the first electronic device 100 is encrypted, the second electronic device 300 may not know information (e.g., device identification information, user ID, and the like) about the first electronic device 100, thereby protecting the first electronic device 100 or personal information of the user of the first electronic device 100.

If receiving identification information from the second electronic device 300, in step 1430, the database server 200 performs user authentication using the identification information. For example, in the case where the identification information includes an ID and a password, the database server 200 may perform user authentication by comparing the ID and password included in the identification information with an ID and a password received during the procedure for registration with a content providing service. In the case where the identification information is encrypted, the database server 200 may decrypt the encrypted identification information and then perform user authentication. In the case where the identification information does not include a password (e.g., in the case where the identification information is device identification information), the user authentication procedure may be skipped.

In step 1435, the database server 200 transmits the user history information to the second electronic device 300. According to an embodiment of the present disclosure, the database server 200 may transmit user history information corresponding to the identification information received from the second electronic device 300.

If receiving the user history information from the database server 200, the second electronic device 300 may transmit the user history information to the content server 400.

If receiving the user history information from the first electronic device 100, in step 1445, the content server 400 transmits content associated with the user history information to the second electronic device 300.

In step 1450, the second electronic device 300 provides the received content to the user.

Figure 5:
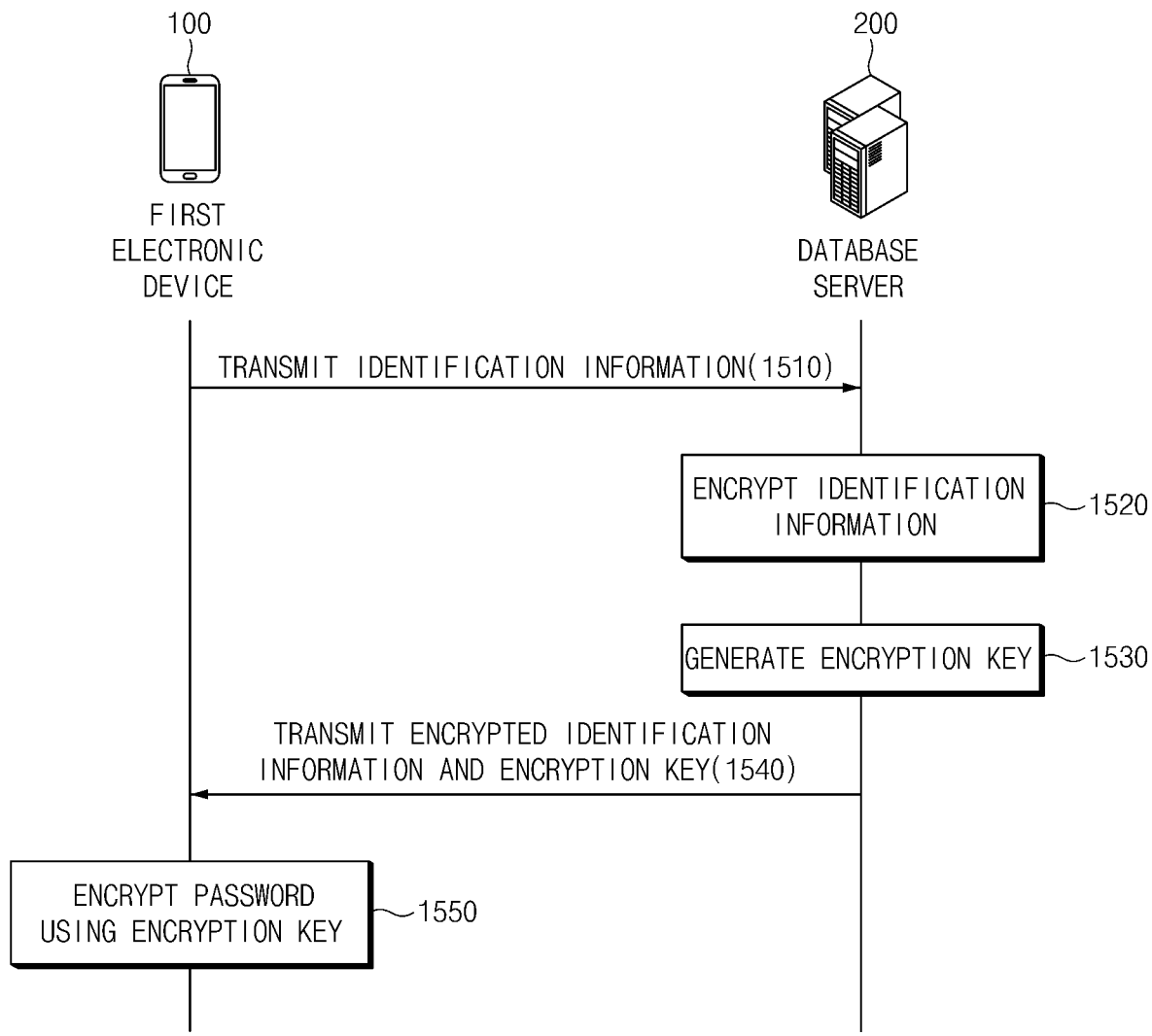
FIG. 5 is a flow diagram illustrating a content providing service registering procedure of a content providing system according to various embodiments of the present disclosure.

FIG. 5 is a flow diagram illustrating a content providing service registering procedure of a content providing system according to various embodiments of the present disclosure.

Referring to FIG. 5, the first electronic device 100 transmits identification information to the database server 200. The identification information may be device identification information (e.g., MSISDN, IMEI, ESN, MAC address, or account information (e.g., identifier (ID) and password) of an application (e.g., a web browser). According to an embodiment of the present disclosure, if an application is executed or account information of an application is entered by a user, the first electronic device 100 may transmit the account information of the application as the identification information. In the case where the content providing system 1000 uses identification information which is not encrypted, the content providing service registering procedure may end at step 1510.

In the case where the content providing system 1000 uses encrypted identification information, in step 1520, the database server 200 may encrypt identification information. According to an embodiment of the present disclosure, in the case where the content providing system 1000 does not support encryption of a password or does not receive account information as identification information, the content providing service registering procedure may be ended at step 1520. In the case where the content providing system 1000 supports encryption of a password and receives account information as identification information, the database server 200 may encrypt only an ID included in the account information. In step 1530, the database server 200 generates an encryption key for encrypting the password. In step 1540, the database server 200 transmits the encrypted identification information and the encryption key to the first electronic device 100.

If receiving the encrypted identification information and the encryption key from the database server 200, in step 1550, the first electronic device 100 encrypts the password using the encryption key. According to an embodiment of the present disclosure, the first electronic device 100 may encrypt the password using the encryption key and time information synchronized with the database server 200.

Figure 6:
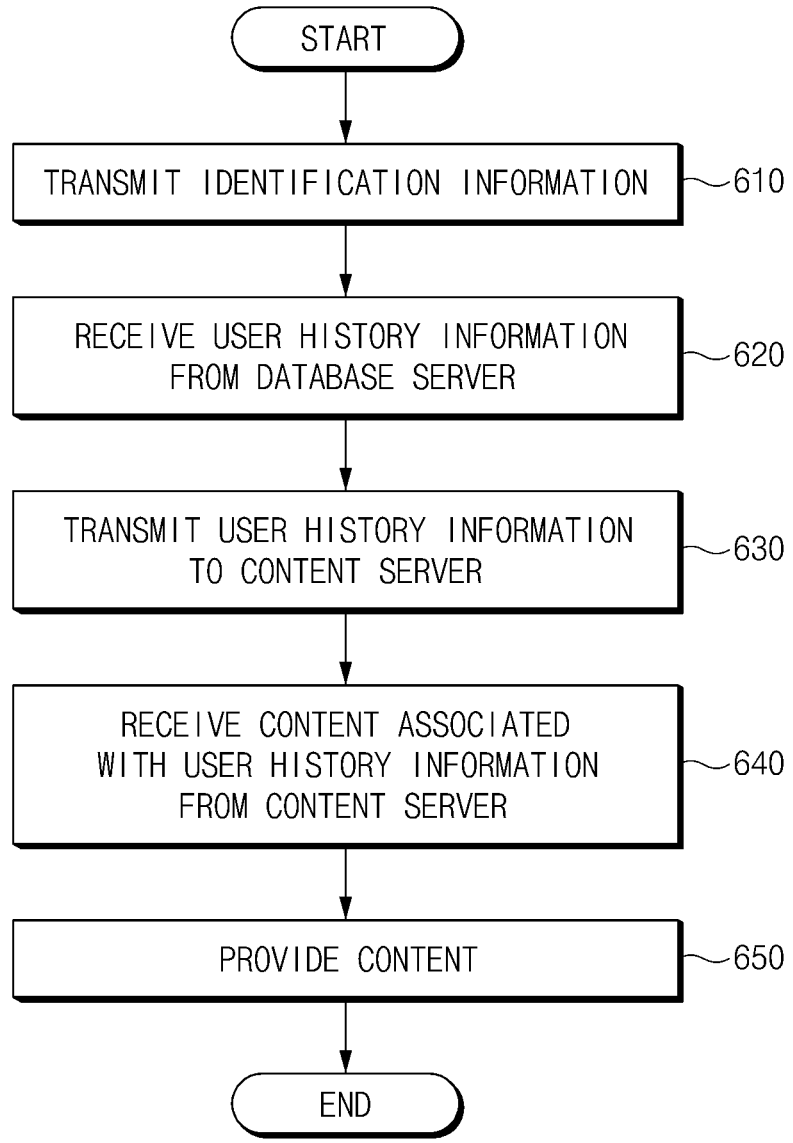
FIG. 6 is a flow chart illustrating a content providing method of a first electronic device according to various embodiments of the present disclosure.

FIG. 6 is a flow chart illustrating a content providing method of a first electronic device according to various embodiments of the present disclosure. The flow chart illustrated in FIG. 6 may include operations, which the electronic device 100 illustrated in FIG. 1 processes, from among operations described with reference to FIGS. 1 to 5. Thus, even though omitted below, a description of the first electronic device 100 given with reference to FIGS. 1 to 5 may be applied to the flow chart shown in FIG. 6.

In step 610, the first electronic device 100 transmits identification information. According to an embodiment of the present disclosure, the first electronic device 100 may transmit identification information within a specific range in a broadcasting manner. For example, in the case where the user carries and moves the first electronic device 100, a range in which the first electronic device 100 transmits the identification information may also move according to a movement of the user; the first electronic device 100 may transmit the identification information to the second electronic device 300 located in a range where the identification information is transmitted. The first electronic device 100 may transmit the identification information using a local area network such as Bluetooth (e.g., BLE), Wi-Fi, NFC, Zigbee, and the like. In the case where the first electronic device 100 transmits the identification information using BLE, the identification information may be transmitted through BLE advertising channels and may be included in a payload portion of a BLE advertising packet. The identification information may be device identification information (e.g., MSISDN, IMEI, ESN, MAC address, or account information (e.g., identifier (ID) and password) of an application (e.g., a web browser). The first electronic device 100 may transmit encrypted identification information.

In step 620, the first electronic device 100 receives user history information, which is generated based on a receiving record of identification information, from the database server 200. According to an embodiment of the present disclosure, the user history information may refer to cookie information which a web browser provides. The user history information which is generated based on the receiving record (e.g., the receiving time) about the identification information may include, for example, a preferred brand, an interested product category, an interested product code, and the like.

If receiving the user history information, in step 630, the first electronic device 100 transmits the user history information to the content server 400. The first electronic device 100 may receive a content associated with the user history information from the content server 400. For example, if the user history information includes a specific product code for which the user searches at an on-line activity, the content server 400 may transmit information about a corresponding product.

In step 650, the first electronic device 100 provides content to the user. For example, the first electronic device 100 may provide content through a display or an audio module such as a speaker.

According to an embodiment of the present disclosure, the first electronic device 100 may perform an operation to register with a content providing service. An operation in which the first electronic device 100 registers with the content providing service is described with reference to FIG. 5, and a detailed description thereof is thus omitted.

According to an embodiment of the present disclosure, the first electronic device 100 may generate user history information based on an on-line activity of the user. The first electronic device 100 may generate and store, for example, a user ID of a specific application or a website (e.g., a website operated by a content provider), a password, a search record, a content (e.g., a specific product or article information) of information requested by a user, product payment information, credit card information, an Internet protocol (IP) address, and the like.

According to an embodiment of the present disclosure, the first electronic device 100 and the database server 200 may share the user history information. For example, if new user history information is generated at the first electronic device 100, the first electronic device 100 may transmit the new user history information to the database server 200, and the first electronic device 100 may receive and store new user history information from the database server 200.

Figure 7:
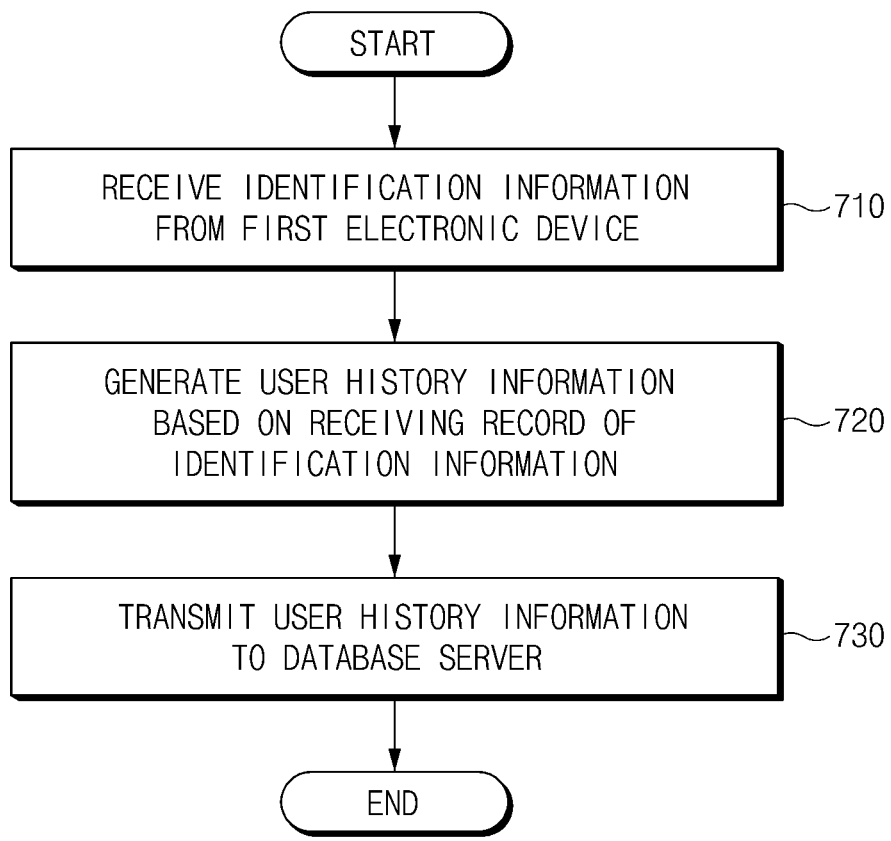
FIG. 7 is a flow chart illustrating a content providing method of a second electronic device according to various embodiments of the present disclosure.

FIG. 7 is a flow chart illustrating a content providing method of a second electronic device according to various embodiments of the present disclosure. A flow chart illustrated in FIG. 7 may include operations, which the second electronic device 300 illustrated in FIG. 1 processes, from among operations described with reference to FIGS. 1 to 4.

Thus, even though omitted below, a description about the second electronic device 300 given with reference to FIGS. 1 to 4 may be applied to the flow chart shown in FIG. 7.

Referring to FIG. 7, in step 710, the second electronic device 300 receives identification information. If receiving identification information from the first electronic device 100, in step 720, the second electronic device 300 generates user history information based on a receiving record (e.g., a receiving time) about the identification information. The user history information which is generated based on the receiving record (e.g., the receiving time) about the identification information may include, for example, a preferred brand, an interested product category, an interested product code, and the like. According to an embodiment of the present disclosure, the user history information may refer to cookie information which a web browser provides. The second electronic device 300 may store attribute information. The attribute information of the second electronic device 300 may include, for example, a service or product category (e.g., foods, men's clothes, and the like), a shop name, a product type (e.g., top, bottoms, coat, and the like), based on a location where the second electronic device 300 is located. The second electronic device 300 may generate user history information based on a receiving record of the identification information and attribute information. For example, if the second electronic device 300 located at a coat shelf of men's clothes shop receives identification information for more than a specific time period, the second electronic device 300 may generate user history information associated with a coat of the men's clothes.

In step 730, the second electronic device 300 transmits the user history information to the database server 200.

If receiving the user history information from the first electronic device 100, the second electronic device 300 transmits identification information to the database server 200. If receiving the user history information corresponding to the identification information from the database server 200, the second electronic device 300 transmits the user history information to the database server 400. If receiving content associated with the user history information from the content server 400, the second electronic device 300 may provide the received content to the user. For example, the second electronic device 300 may provide content through a display or an audio module such as a speaker.

The term "module" as used herein may represent, for example, a unit including one or more combinations of hardware, software and firmware. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific IC (ASIC) chip, a field-programmable gate array (FPGA), and a programmable-logic device for performing some operations, which are known or will be developed.

According to various embodiments of the present disclosure, at least a part of a device (e.g., modules or the functions) or a method (e.g., operations) may be implemented with, for example, instructions stored in a computer-readable storage media which has a program module. If the instructions are executed by a processor, the one or more processors may perform functions corresponding to the instructions. The computer-readable storage media may be, for example, a memory.

A computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk), and hardware devices (e.g., a read only memory (ROM), a random access memory (RAM), or a flash memory). A program instruction may include not only code generated by a compiler but also a high-level language code executable on a computer using an interpreter. The above-mentioned hardware device may be configured to operate as one or more software modules to perform operations according to various embodiments of the present disclosure, and vice versa.

Modules or program modules according to various embodiments of the present disclosure may include at least one or more of the above-mentioned components, some of the above-mentioned components may be omitted, or other additional components may be further included therein. Operations executed by modules, program modules, or other elements may be executed by a successive method, a parallel method, a repeated method, or a heuristic method. Also, a portion of operations may be executed in different sequences, omitted, or other operations may be added.

According to various embodiments of the present disclosure, user-customized content may be provided through an electronic device of a user or a public electronic device based on user history information associated with a web activity or an off-line activity of the user.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of providing content by an electronic device, the method comprising:
   transmitting identification information to a database server;
   receiving encrypted identification information and an encryption key from the database server;
   encrypting a password using the encryption key and time information synchronized with the database server;
   broadcasting the encrypted identification information and the encrypted password;
   receiving, from the database server, user history information provided as cookie information, the user history being generated by off-line activity or online activity of a user, and based on a receiving time of the encrypted identification information;
   transmitting the user history information to a content server;
   receiving, from the content server, content associated with the user history information; and
   outputting the received content associated with the user history information to a web browser,
   wherein the encrypted identification information is broadcast according to Bluetooth low energy (BLE).

2. The method of claim 1, wherein the identification information is included in a payload portion of a BLE advertising packet.

3. The method of claim 1, further comprising:
   generating the user history information based on a web activity of the user.

4. An electronic device, comprising:
   a communication circuit;
   a memory; and a processor configured to:
transmit, via the communication circuit, identification information to a database server,
receive encrypted identification information and an encryption key from the database server,
encrypt a password using the encryption key and time information synchronized with the database server,
broadcast, via the communication circuit, the encrypted identification information and the encrypted password,
receive, from the database server, user history information provided as cookie information, the user history information being generated by off-line activity or online activity of a user, and based on a receiving time of the encrypted identification information,
transmit the user history information to a content server,
receive, from the content server, content associated with the user history information, and
output the received content associated with the user history information to a web browser,
wherein the encrypted identification information is broadcast according to Bluetooth low energy (BLE).

5. The electronic device of claim 4, wherein the identification information is included in a payload portion of a BLE advertising packet.

6. The electronic device of claim 4, wherein the processor is further configured to:
generate the user history information based on a web activity of the user.

* * * * *